United States Statutory Invention Registration [19]

[11] Reg. Number: H627

Peng [43] Published: Apr. 4, 1989

[54] SPHERICAL TORUS FUSION REACTOR

[75] Inventor: Yueng-Kay M. Peng, Oak Ridge, Tenn.

[73] Assignee: The United States of America as represented by the United States Department of Energy, Washington, D.C.

[21] Appl. No.: 783,604

[22] Filed: Oct. 3, 1985

[51] Int. Cl.[4] ..... G21B 1/00

[52] U.S. Cl. ..... 376/142; 376/133

[58] Field of Search ..... 376/121, 133, 142

[56] References Cited

U.S. PATENT DOCUMENTS

| | | | |
|---|---|---|---|
| 3,778,343 | 12/1973 | Coppi et al. | 376/133 |
| 4,263,097 | 4/1981 | Ohkawa | 376/133 |
| 4,268,353 | 5/1981 | Powell et al. | 376/142 |
| 4,330,864 | 5/1982 | Ohyabu | 376/142 |
| 4,363,776 | 12/1982 | Yamada et al. | 376/133 |
| 4,392,918 | 7/1983 | Gaines | 376/133 |
| 4,430,600 | 2/1984 | Sheffield et al. | 376/133 |
| 4,472,344 | 9/1984 | Loftstalt | 376/133 |
| 4,543,231 | 9/1985 | Ohkawa | 376/142 |
| 4,560,528 | 12/1985 | Ohkawa | 376/133 |

FOREIGN PATENT DOCUMENTS

| | | | |
|---|---|---|---|
| 53-72993 | 6/1978 | Japan | 376/133 |

OTHER PUBLICATIONS

Stacey, Jr. et al., "A Tokamak Exp. Power Reactor," Nucl. Tech. vol. 30, Sep. 1976, pp. 261–298.

Coppi, "Comments Plasma Phys. Cont. Fusion," vol. 3, No. 2, pp. 47–62, 1977.

Katsurai et al., "Studies of Conceptual Spheromak Fusion Reactors," *Nuclear Fusion,* vol. 22, No. 11, pp. 1407–1419, 1982.

Waldrop, "Compact Fusion: Small is Beautiful," *Science,* vol. 219, pp. 154–156, Jan. 1983.

Hagenson et al., "Compact Reverse Field Pinch Reactors," Los Alamos Nat. Lab., LA—10200—MS, Aug. 1984.

*Primary Examiner*—Deborah L. Kyle

*Assistant Examiner*—Richard L. Klein

*Attorney, Agent, or Firm*—David E. Breeden; Stephen D. Hamel; Judson R. Hightower

[57] ABSTRACT

A fusion reactor is provided having a near spherical-shaped plasma with a modest central opening through which straight segments of toroidal field coils extend that carry electrical current for generating a toroidal magnet plasma confinement fields. By retaining only the indispensable components inboard of the plasma torus, principally the cooled toroidal field conductors and in some cases a vacuum containment vessel wall, the fusion reactor features an exceptionally small aspect ratio (typically about 1.5), a naturally elongated plasma cross section without extensive field shaping, requires low strength magnetic containment fields, small size and high beta. These features combine to produce a spherical torus plasma in a unique physics regime which permits compact fusion at low field and modest cost.

12 Claims, 8 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

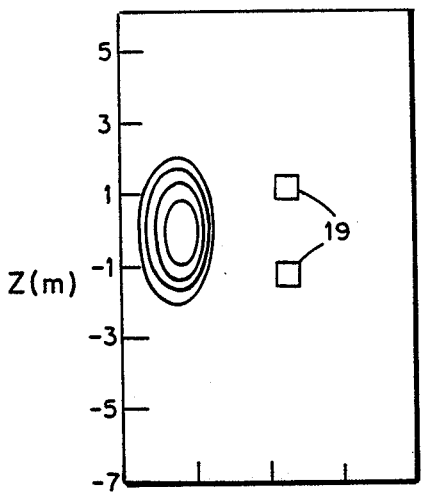
Fig. 4
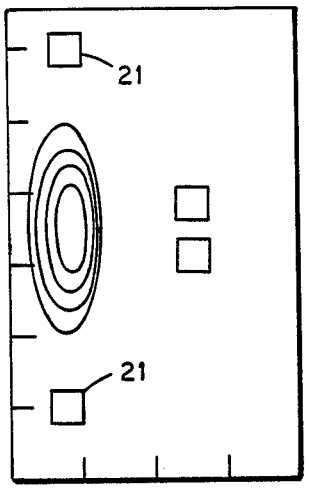
Fig. 5
Fig. 11
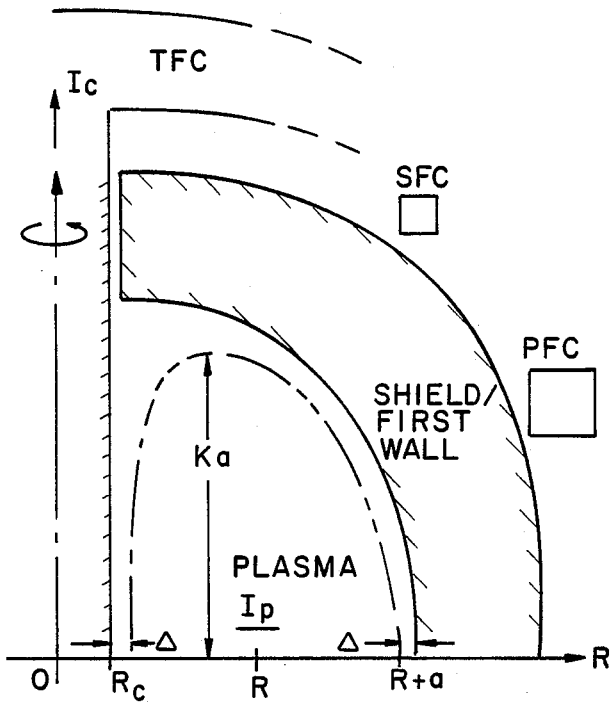

SPHERICAL TORUS FUSION REACTOR

This invention, which is a result of a contract with the U.S. Department of Energy, is in the field of fusion reactor designs and more specifically relates to compact torus fusion reactor designs.

BACKGROUND OF THE INVENTION

Although the tokamak is the leading magnetic fusion approach worldwide, its design embodiment and associated physics have not been attractive to the potential commercial users of magnetic fusion. Serious design concept development for a device to carry out ignition and burn physics and/or fusion engineering development in magnetic fusion has been in progress for several years. Prominent concepts and associated reference material include the following: Engineering Test Facility (ETF), ETF Design Center Team, Engineering Test Facility Mission Statement Document, ORNL/TM-6733, Oak Ridge National Laboratory (1980); International Tokamak Reactor (INTOR), INTOR Group, Nuclear Fusion 23, 1513 (1983); Fusion Engineering Device (FED), Fusion Engineering Device Design Description, ORNL/TM-7948, Oak Ridge National Laboratory (1981); and the Toroidal Fusion Core Experiment (TFCX), "The Toroidal Fusion Core Experiment (TFCX) Studies", paper IAEA-CN-44/H-I-3, presented at the Tenth International Conference on Plasma Physics and Controlled Nuclear Fusion Research, London, England, Sept. 12–19 (1984). The estimated, direct total cost of each of these systems is about $1 billion or more with perceived high risk in achieving the stated performance goals. Thus, continued progress of fusion can be enhanced if a design can be found which provides a more favorable cost risk-to-benefit ratio (i.e., an embodiment with small unit size and limited risk in reaching adequate plasma and fusion engineering performance).

Major factors that contribute to the larger size and higher cost of the aforementioned design studies can be traced to a combination of physics assumptions, engineering criteria, nnd conventional tokamak wisdom. The conventional wisdom of tokamak operation and prudent engineering suggests the inclusion of a solenoid for inductive current drive, nuclear shields inboard of the plasma torus for protection of inboard coils and insulators, and a separate first wall and vacuum boundary. These items tend to increase the major radius of the torus and aspect ratio (major radius divided by the minor radius of the torus), which, in turn, leads to modest values of average beta (the plasma pressure divided by the magnetic field pressure containing the plasma, typically up to about 5% for aspect ratios of about 3). In the physics area, the assumed plasma energy confinement efficiency at reactor conditions leads to large plasma major and minor radii (about 3 meters or more and 1 meter or so, respectively) and plasma current of 6 to 12 megamperes (MA) when intermediate values of magnetic field between 4 and 6 tesla (T) are employed. For ignition devices with significant burn, a typical design has about 100 cubic meters in plasma volume, 100 megajoules (MJ) in plasma thermal energy content, and produces about 200 megawatts (MW) of deuterium-tritium (D-T) fusion power. The latest cost estimate of such a device using copper toroidal field (TF) coils is about $1 billion. Therefore, it is readily apparent that there is a need for a fusion device with small unit size, and limited risk in reaching adequate plasma and engineering performance.

SUMMARY OF THE INVENTION

In view of the above need it is an object of this invention to provide a compact toroidal-type fusion reactor with an improved cost risk-to-benefit ratio.

Another object of this invention is to provide a compact torus fusion reactor with dramatic simplification of plasma confinement design.

Yet another object of this invention is to provide a compact torus fusion reactor with low magnetic field and small aspect ratio stable plasma confinement.

In accordance with the principles of this invention there is provided a compact toroidal-type plasma confinement fusion reactor in which only the indispensable components inboard of a tokamak type of plasma confinement region, mainly a current conducting medium which carries electrical current for producing a toroidal magnet confinement field about the toroidal plasma region, are retained. The result is a plasma confinement region having an aspect ratio (A) of less than 2, a beta of greater than 20%, high plasma current and low magnetic field (1) less than 3T) which produces a highly stable toroidal-type plasma with natural elongation resembling a sphere with a modest hole through the center, suggesting the name of spherical torus.

A typical example of ignition and burn spherical torus made in accordance with this invention may have a magnetic field strength of 2T at the plasma center has a major radius of 1.5 m, a minor radius of 1.0 m, a plasma current of 14 MA, a fusion power of 50 MW, an average beta of 24%, and a plasma thermal energy content of 30 MJ.

BRIEF DESCRIPTION OF THE DRAWINGS

FIG. 4 is a graph of the nested magnetic field lines of a spherical torus illustrating the natural elongation of the plasma cross section at an aspect ratio of 1.5 with only poloidal vertical field coils.

FIG. 5 is a graph as in FIG. 4 illustrating a strongly elongated plasma by adding poloidal field shaping coils above and below the torus.

FIG. 11 is a schematic view of a partial cross section illustrating an alternate IST embodiment in which the separate first wall confinement structure is eliminated and the TF coils are formed outboard of the neutron shield/first wall and poloidal field coils.

DETAILED DESCRIPTION

Figure 1:
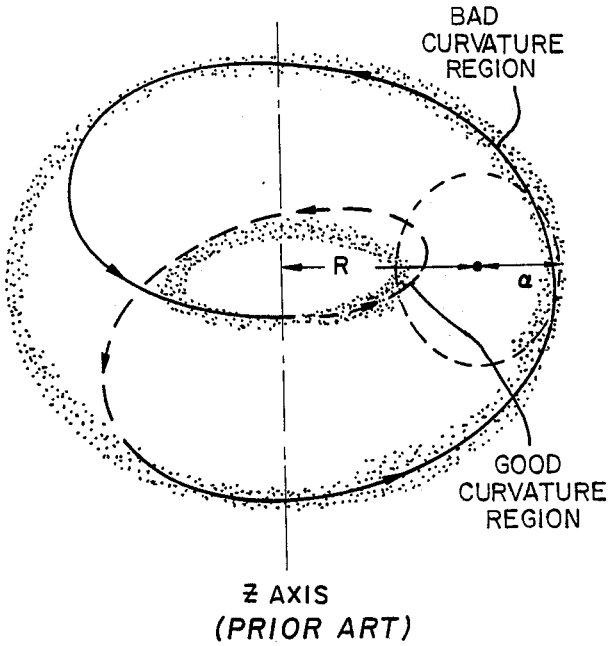
FIGS. 1 and 2 illustrate the relative shapes and sizes of a conventional tokamak plasma and a spherical torus plasma, respectively, together with a comparison of the magnetic confinement field lines on the $q=2$ surfaces. The portion of the field lines in the good curvature region are dashed.
Figure 2:
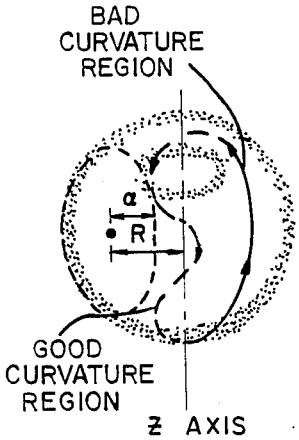
Figure 3:
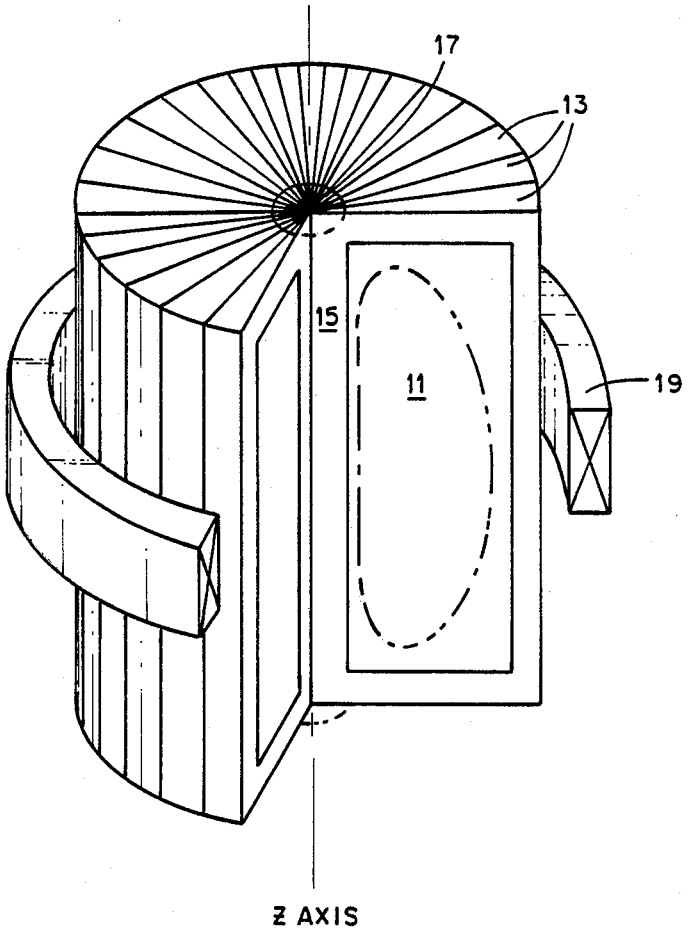
FIG. 3 is a schematic diagram of an example of a spherical torus plasma confinement scheme in accordance with the basic plasma confinement principles of this invention.

FIG. 1 is a schematic diagram of a conventional tokamak plasma configuration and FIG. 2 is a schematic diagram of a spherical torus plasma configuration achieved by the spherical torus plasma confinement scheme according to the present invention as illustrated in FIG. 3. The spherical torus obtains a low aspect ratio (ratio of major radius R to minor radius a) plasma torus with high beta; naturally large elongation (ratio of height to width or minor radius), high plasma current, strong plasma paramagnetism (self-generated magnetic field), and tokamak-like plasma confinement, which places the spherical torus in a plasma regime distinct from tokamak designs of conventional aspect ratios greater than 3. As shown in FIG. 3, the compact spherical torus device plasma 11 may be maintained by a plurality of toroidal field (TF) coils 13 substantially uniformly disposed about a main axis (Z axis) with wedge-shaped central legs 15 which fit together to form a circular cross section center conductor post 17 centered on the Z axis. The central wedge portions 15 of each coil 13 may be insulated by coating the contacting surfaces with an electrical insulating material.

Due to the modest field (typically about 2T at the center of the plasma torus cross section) rectangular TF coils may be used with the centering inplane loads reacted by the wedging at the center leg. Thus, the TF coils are essentially free-standing with only minimal support as will be described in the following description of the preferred ignition spherical torus embodiment. At least one poloidal field coil 19 is provided to aid in positioning the magnetic field lines along the outboard side of the plasma torus to minimize plasma drift due to the weaker field brought about by the unavoidable increased spacing between the TF coils along the outer circumference.

Free-boundary magnetohydrodynamics (MHD) equilibrium calculations show that an elongation of $K=2$ occurs naturally in the spherical torus with an aspect ratio of $A=1.5$ when only dipole vertical field is applied (see FIG. 4), which in this case is produced by the two poloidal field coils 19 at a significant distance from the outboard side of the plasma. When a quadruple shaping field is applied via additional poloidally disposed shaping field (SF) coils 21 (as shown in FIG. 5) above and below the plasma, an elongation of about 3 is obtained. In the conventional tokamak, the natural plasma elongation is less than 1.4 and very strong shaping coil currents are required to obtain elongation of around 2.

Thus, it will be appreciated that a large elongation is a natural feature of the spherical torus relative to tokamaks of conventional aspect ratios, i.e., greater than 2.5. These factors combined with the smaller poloidal coil radii, lead to large savings in the cost of the magnet system as compared to conventional tokamaks.

The equilibrium toroidal plasma current Ip(MA) may be approximately calculated as:

$$Ip=[5a\ B/q][C\cdot\epsilon/(1-\epsilon^2)^2][(1+K^2)/2]$$

where $\epsilon=1/A$, $C=1.22-0.68\epsilon$, K is the plasma elongation (height-to-width ratio of the plasma cross section), B is the externally applied toroidal magnetic field strength at the plasma center and q is the plasma safety factor at the plasma boundary. The strong toroidicity introduced as A approaches 1 permits large increases of $I_p$ without reducing q to unacceptably low values. The plasma beta ($\beta$) may be scaled in accordance with the following form:

$$\beta=0.2[(1+K^2)/2]/Aq$$

Recent comparisons with MHD stability analysis and experimental results has coalesced the influences of these plasma parameters into the plasma current, giving:

$$\beta=C_\beta I_p/aB$$

where the latest assessment of the valve of the constant $C_\beta$ is about 0.033. Thus, it will be seen that beta either increases with increasing K and with decreasing Aq or with increasing $I_p/a\beta$. An example of equilibrium with $A=1.5$, $K=3$, $B=2T$, $a=0.88$ meters, and $q=2.4$ gives a plasma current of 14 MA and a beta of 26%.

A high plasma current is permitted in a spherical torus plasma because the poloidal field produced by the plasma current becomes comparable and larger than the toroidal field at the outboard region while they are comparable in the inboard region. On the other hand, while the toroidal circumference at the outboard region is comparable to the poloidal circumference, the former is drastically shorter than the latter at the inboard region. As depicted in FIG. 2 by a field line plotted on the $q=2$ surface, this gives highly pitched field lines at the outboard region, introducing only a small amount of toroidal rotation, but gives moderately pitched field lines at the inboard region, introducing a large amount of toroidal rotation. The net result is a strongly enhanced total toroidal rotation (higher q) for a given plasma current, or a higher plasma current for a given q. In comparison with this, a conventional tokamak permits only a small pitch to the field line for a given q, as shown in FIG. 1, and hence a relatively modest plasma current.

That such a magnetic field configuration should give high beta for MHD stability can also be seen from a comparison of FIGS. 1 and 2. In comparison with a conventional tokamak, the spherical torus has a short field line length (solid portion of the depicted field line) in the bad curvature region (outboard of the plasma) relative to that in the good curvature region as shown by the dotted portion of the depicted field line, whereas the tokamak is exactly the opposite. The result is improved plasma confinement over that of the conventional tokamak.

Figure 6:
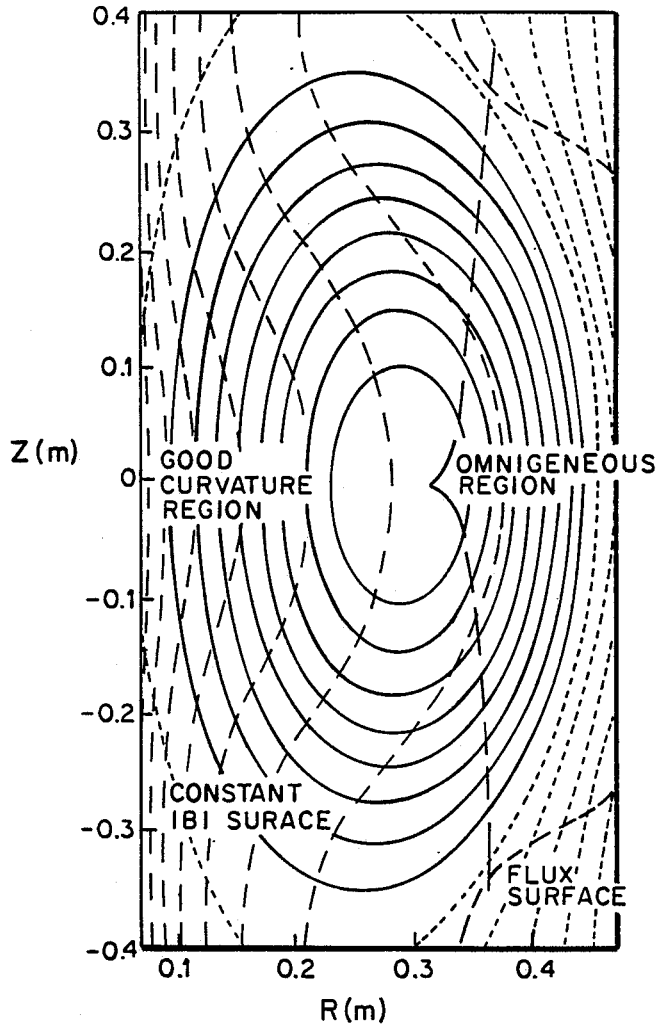
FIG. 6 is a graph of spherical torus plasma confinement flux surfaces (solid and dotted lines) and the mod-B ($|B|$) surfaces (dashed lines). A near-omnigeneous region is formed to the right of the heavy dashed line. The plasma paramagnetism leads to parallel flux and mod-B surfaces in the outboard region making charged particle drift orbits parallel to the flux surfaces (near -omnigeneity), mitigating trapped particle effects and improving neo-classical confinement.

The resulting strong paramagnetism of the spherical torus introduces a magnetic configuration which is dramatically different from that of a conventional tokamak. As shown in FIG. 6, the strongly enhanced toroidal field at the plasma core and the dominating poloidal field at the outboard region of the plasma create a strong curvature of the surfaces of constant field strength, $|B|$, making them largely parallel to the flux surfaces there. In this region, the particle drift orbits coincide with the flux surfaces since the curvature gradient drifts are parallel to the flux surfaces. This predominantly omnigeneous region, i.e., region of good confinement for all classes of plasma particles, largely coincides with the region of bad curvature of MHD instability where the magnetic pressure gradient and the field line curvature provide a positive scaler product. This region is nearly absent of locally trapped particles, contributing to the kinetic stability of the plasma, although trapped particles still exist between the top and bottom regions of the plasma. These trapped particles have orbits that deviate weakly from the flux surfaces because of the reduced region where the curvature and gradient drifts deviate from the parallel drift. This will result in a reduced "banana" orbit width, i.e., the banana-shaped particle drift orbit as the orbit is projected on a single poloidal plane, and is expected to lead to a reduced neoclassical transport.

Figure 7:
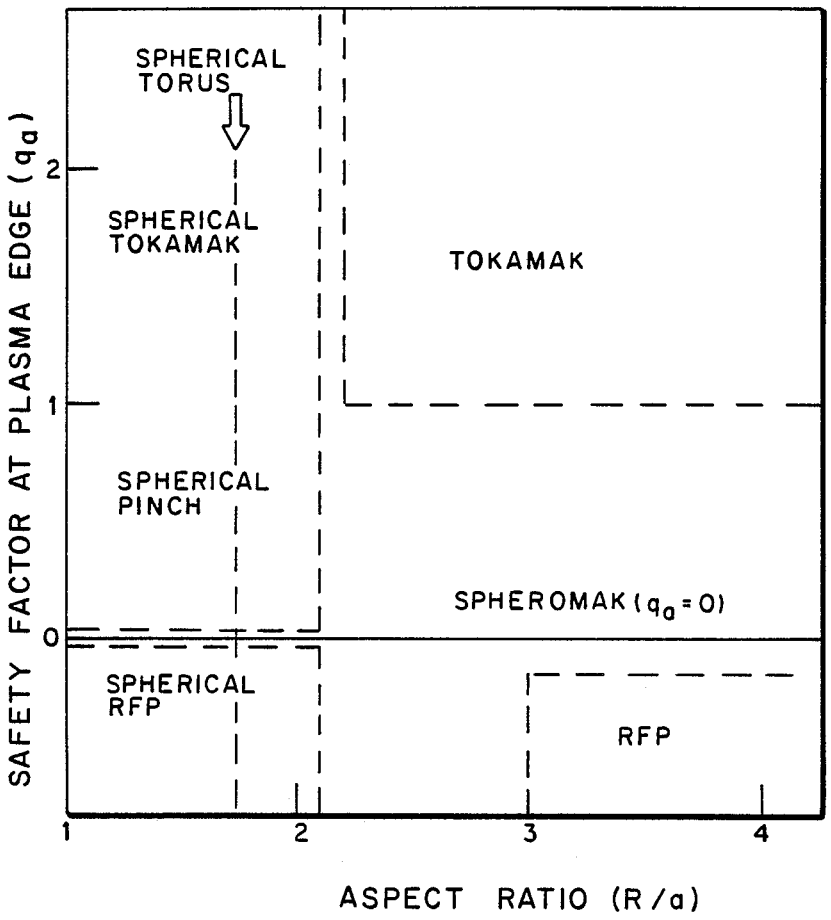
FIG. 7 is a plot in the space of safety factor at the plasma edge ($q_a$) and aspect ratio (A) illustrating the domain of spherical torii (spherical tokamak, spherical pinch and spherical RFP), relative to those of conventional tokamak, spheromak, and RFP device in the $q_a$ and A space.

The spherical torus is capable of operating in accordance with different classes of plasma confinement regimes at aspect ratios less than 2, as illustrated in FIG. 7. As the value of the externally applied toroidal field at the center ($B_{to}$) of the plasma is reduced relative to the plasma current (with the safety factory at the plasma edge $q_a$, reduced to below 1), plasma paramagnetism is further enhanced because of the increased pitch of the magnetic field line. As $B_{to}$ is reduced through zero and beyond to $B_{to}<0$ (field reversal) and $q_a$ is reduced to less than zero, calculations have shown that the plasma retains its naturally large elongation although the $|B|$ surfaces are drastically different in configuration from those of a spherical torus of $q_a>1$, which is shown in FIG. 6 for a tokamak type of plasma confinement. Thus, the following classes of spherical tori are evident.

1. Spherical tokamak with $q_a>1$,
2. Spherical pinch with $1>q_a>0$,
3. Spheromak with $q_q=0$, and
4. Spherical reverse field pinch (RFP) with $q_a<0$.

The domain of these different classes of spherical tori relative to tokamak, spheromak, and RFP are depicted in FIG. 7.

Figure 8:
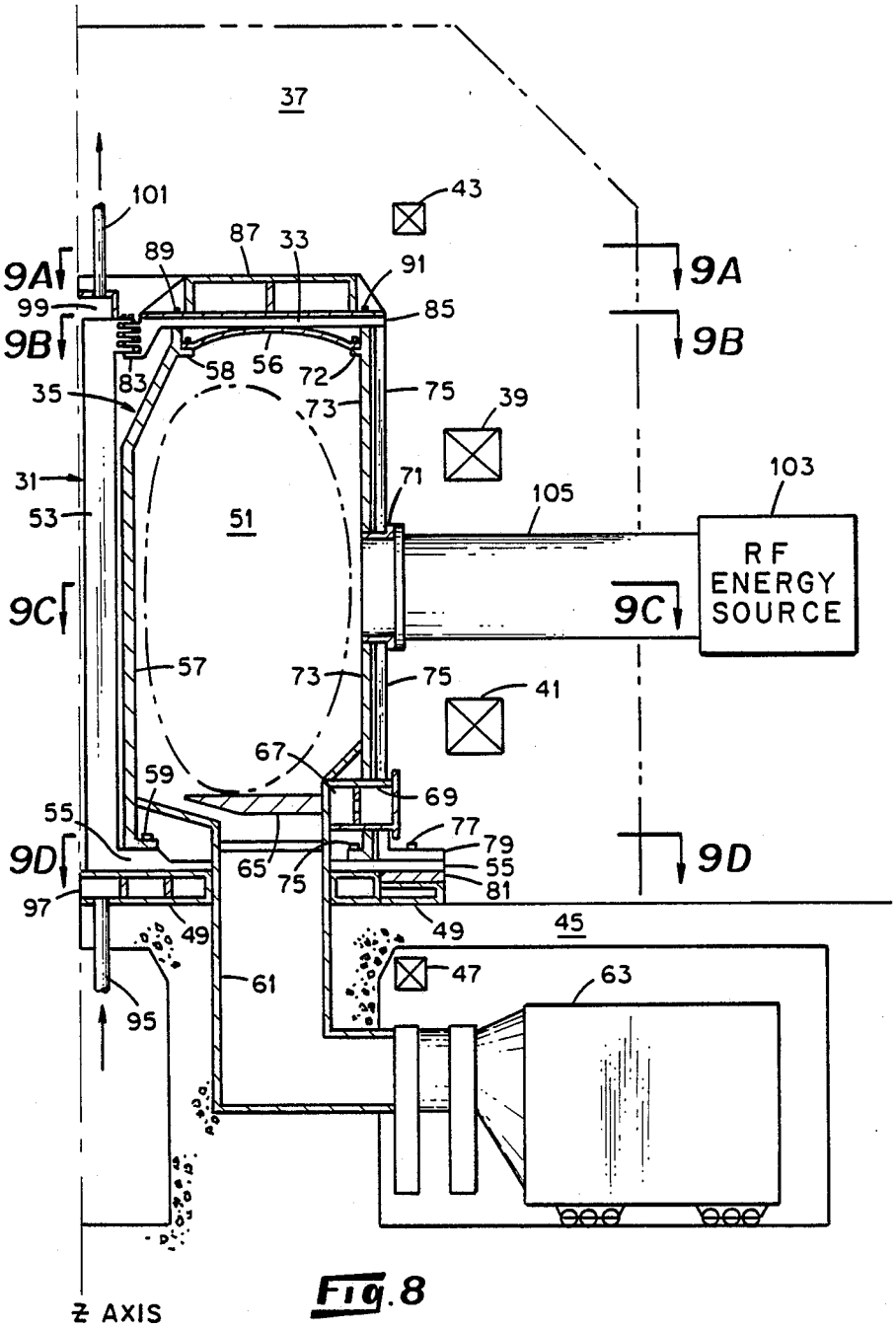
FIG. 8 is a partial cross-sectioned elevational view of an ignition spherical torus (IST) configured in accordance with the present invention.
Figure 9:
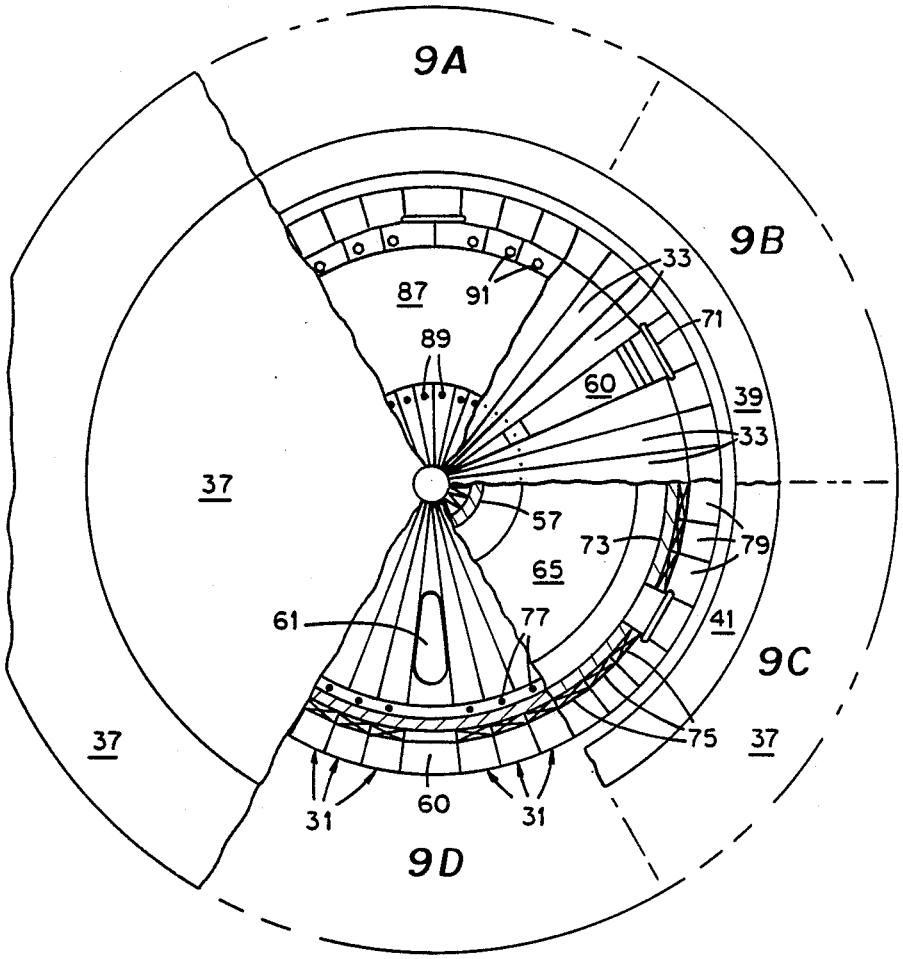
FIG. 9 is a top sectioned view of the IST of FIG. 8.

Referring now to FIGS. 8 and 9, wherein there is shown a preferred embodiment of an ignition spherical torus (IST) fusion reactor made in accordance with the spherical torus plasma confinement concept of this invention. The primary features of this IST configuration include: (1) a 36-turn TF coil system connected in series with the top leg 33 of each rectangular-shaped coil 31 removable for access, (2) a thick-wall vacuum vessel-/first wall structure 35 which also functions as an inter-coil support structure, making the torus relatively independent of the shield and poloidal field coil structures, and (3) an external shielding system 37 containing a neutron shield, lithium blanket, the poloidal field coils 39 and 41 and the top shaping field coil 43. The shield 37 may be constructed in various forms as are well known in the art and can be removed from over the torus structure for access.

The reactor is supported by a base support structure 45 which may take the form of a concrete floor structure as shown in FIG. 8. The bottom shaping field coil 47 may be placed within the base support structure, as shown, and supported thereby. The torus structure rests on a bottom circular plate like support structure 49, which may be formed of steel and is supported by the base structure 45.

Due to the modest magnetic fields required for confinement of the spherical torus plasma 51, rectangular TF coils 31 may be used which are constructed in three segments. The centering loads are reacted by wedging the inboard pie-shaped cross section 53 of each TF coil together to form a circular center post (see FIG. 10), thereby removing the need for a center support or wedge post which increases the major diameter of the torus.

Each TF coil inboard segment 53 is an L-shaped segment including a base portion 55 which extends radially outward from the center post section 53 and rests on the support member 49. The inboard segments are placed into position with the wedge-shaped portions aligned to form a circular cross section center post and an inboard, cylindrical vacuum vessel wall segment 57 is lowered into place about the center post and bolted through each TF coil base segment 55 to the base plate 49 by means of bolts 59 which are electrically insulated from the TF coils.

The reactor is divided into six sections as illustrated in FIG. 9, each section containing 6 TF coils 31. The coils are arranged in each section so as to provide an access space 60 between midsection coils to accommodate access for a vacuum system duct 61 which opens into the plasma chamber and forms the bottom portion of the vacuum vessel as shown in FIG. 8. Each duct 61 is connected to a corresponding one of six cryogenic pumping systems 63 (only one shown in FIG. 8) which operate in a conventional manner to evacuate the plasma chamber during operation. The throat of each duct 61 is partially covered by an annular, stainless steel plate 65 which forms a conventional pump limiter to allow proper removal of plasma particles, impurities and fusion by-products. The limiter plate 65 is cooled by passing water through an annular cooling duct 67 from which the limiter 65 is mounted about the outeredge in a heat conducting arrangement therewith. Access to the duct 67 is through ports 69 provided at the access space of each coil section. The ports 69 together with plasma access ports 71 are formed in an outboard cylinder 73 which forms the outboard wall of the plasma vacuum chamber. This cylinder is lowered into place and bolted through the base 55 of the individual TF coils 31 to the base plate 49 by means of bolts 75 which are also electrically insulated from the coil base 55.

To complete the toroidal vacuum vessel, a top access plate, in the form of an annular plate 56, is lowered into place and bolted to the inboard cylinder wall 57 and the outboard cylinder wall 73 at flanges 58 and 72, respectively. O-ring seals are provided at the joints with the wall sections to provide vacuum seals between the top plate 56 and the wall segments. Typically the operating pressure in the vacuum vessel is about $10^{-4}$ Torr.

Once the vacuum vessel structure 35 is in place the outer legs 75 of each of the TF coils are bolted into position by means of insulated bolts 77 which extend through a lower flange 79 of the leg 75, the coil base 55 and into the base member 49. The flange 77 lower surface is electrically insulated from the corresponding coil base 55, but extends into electrical contact with the adjacent coil base to provide the series connection between TF coils. An annular bus 81 is provided below the TF coil base 55 which is electrically insulated from all but the first series connected TF coil base and is connected electrically to a power supply (not shown) so that the current encircles the torus prior to flowing into the first coil base 55 to cancel the magnetic field produced by the circumferential coil interconnections where the current flows in the opposite direction from that in the bus 81.

The removable top portion 33 of each TF coil is connected at each end to the inboard segment 53 and the outboard segment 75 by means of bolted multiple lap joints at points 83 and 85, respectively. The torus is held in assembly at the top by means of an annular cap 87 which is bolted to the upper edges of the inboard and outboard vacuum wall cylinders 57 and 73, by means of bolts 89 and 91, respectively, through each of the top coil segments 33. These bolts are also electrically insulated from the coil segments 33.

Each of the TF coil segments are formed from solid copper, or an alloy thereof having comparable conductivity such as Cu-Ni-Be alloy (C-17510), and supported primarily by the vacuum vessel structure. All of the surfaces which either contact the structure, adjacent the coil segments, bolt holes, or the power supply bussing which require electrical insulation are insulated by an inorganic insulating coating formed on the coil segments prior to assembly. This coating may take various forms such as ceramics, or other metal oxide insulating materials which are less subject to radiation exposure damage than organic insulating materials. In some cases, for short total D-T burn times of about $2\times10^4$ seconds, organic insulating materials such as epoxy-fiberglass or polyimide fiberglass insulating materials may be used without shields.

Figure 10:
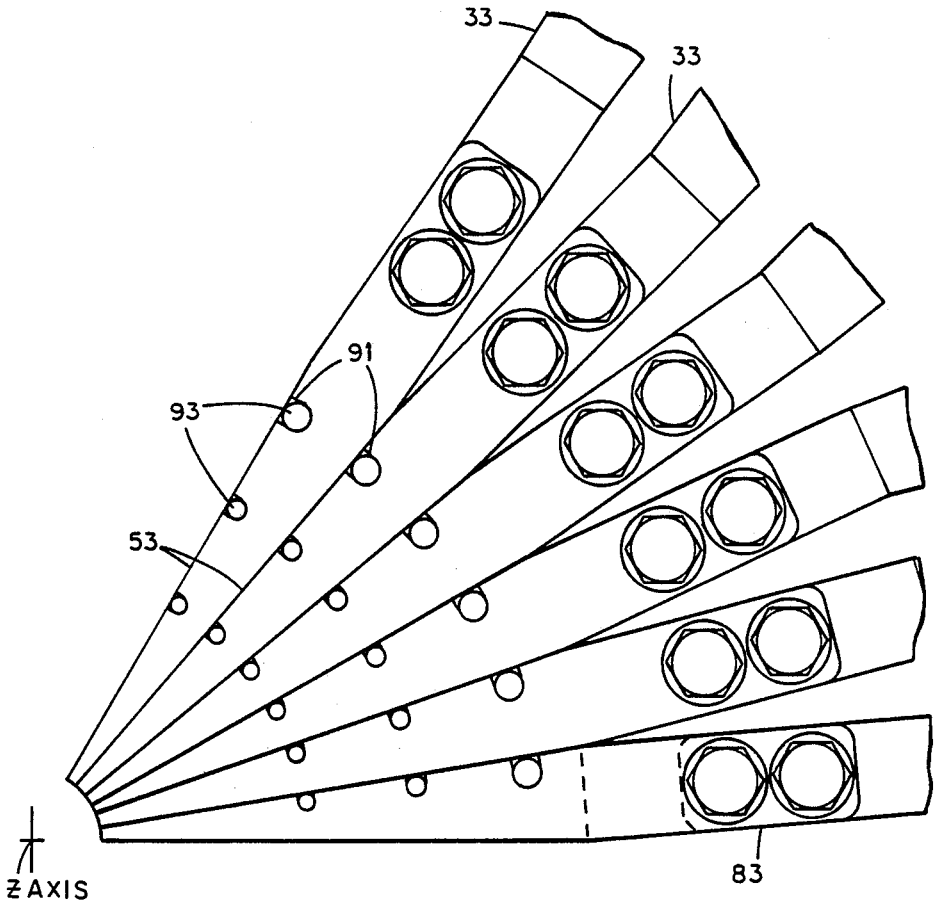
FIG. 10 is an enlarged top view of a central portion of one six TF coil segment of the IST of FIG. 9.

As shown in FIG. 10 the center post of the torus is formed by wedging the inboard, pie-shaped segments 53 of the TF coils together in a circular array about the Z axis. The post is cooled by machining cooling channels 91 in one or both abutting faces of the coil segments 53 and installing copper coolant flow tubes 93 through which water is passed during operation from an inlet conduit 95 (FIG. 8) through an inlet manifold chamber 97 at the bottom and out through an exhaust manifold chamber 99 and exit conduit 101. For a center post diameter of about 0.4 meter and operating at a center post current density of about 3 KA/cm$^2$, high-speed (about 20 m/sec) pressurized water is used to maintain a safe maximum conductor temperature during D-T burn times of about 50 sec. This translates into a TF coil current of about 15 M for an IST as described having a toroidal field ($B_o$=2T), a major radius of 1.5 m, a minor radius of 1 m, a plasma current of 14 MA at a safety factor of 2.4, an average toroidal beta of 24%, and a fusion power of 50 MW.

The small major radius and aspect ratio leads to a small plasma inductance and facilitates plasma current drive by reducing the flux required through external sources. Thus, start-up of the plasma current may be significantly assisted via the vertical field coils 39 and 41 by applying a time-varying current component similar to that used in poloidal field coils in a tokamak device. However, ramp-up of the current to ignition values may be accomplished by means of injecting RF energy from RF energy sources 103 through wave guides 105 in each section and injected through access ports 71 in accordance with known RF heating and current drive techniques. Although the above description of a preferred embodiment of the invention has been limited to a device having a separate first wall (vacuum vessel wall 57) inboard of the plasma 51, the following alternative versions are considered to be within the scope of this invention. (1) A small solenoid can be included inboard to the plasma to provide additional inductive plasma current drive capability. Aspect ratios below 2 can still be maintained by reducing the field B and increasing the plasma radii. (2) A more advanced concept is also feasible in which the center conductor post forms the first wall as illustrated schematically in FIG. 11. This embodiment permits more flexibility in the arrangement of the neutron shield which may be either outboard of the TF coils as in FIG. 8 or inboard of the TF coils as illustrated in FIG. 11. In the advanced concept IST, inorganic coil insulating materials are required in order for the center post to withstand the neutron radiation and extend the coil life.

The following table provides a comparison of various parameters for D-T ignition and burn spherical tori for an advanced configuration (FIG. 11) and a separate first wall configuration (FIG. 8).

TABLE

| PARAMETERS | ADVANCED CONCEPT | SEPARATE FIRST WALL |
|---|---|---|
| Major radius R(m) | 1.34 | 1.53 |
| Minor radius a(m) | 0.88 | 0.97 |
| Center post radius $R_c$(m) | 0.38 | 0.40 |
| Center Post Current $I_c$(MA) | 13.4 | 15.3 |
| Plasma Current $I_p$(MA) | 14.0 | 14.1 |
| D-T Fusion Power $P_{DT}$(M Watts) | 52 | 60 |
| Neutron wall loading $W_L^N$ (MW/m$^2$) | 0.62 | 0.54 |
| Plasma Current Maintenance power $P_{CD}$(MW) | 8.4 | 8.6 |
| Plasma scrape-off layer Δ(m) | 0.09 | 0.16 |
| Plasma Density n($10^{20}$ m$^{-3}$) | 0.66 | 0.59 |
| Beta β | 0.26 | 0.24 |
| Toroidal Field $B_o$(T) | 2 | 2 |
| Center Post Current Density $J_c$(KA/cm$^2$) | 3 | 3 |
| Plasma Elongation K | 2 | 2 |
| Plasma Temperature T(kev) | 20 | 20 |
| Ignition Parameter $C_{ig}$(Mirnov) | 1.5 | 1.5 |

In the above table, the plasma ignition parmeter ($C_{ig}$) is determined as follows, assuming Mirnov scaling:

$$C_{ig}=0.295\beta\tau(s)B^2(T)$$

where $\tau$ (seconds)=0.39a(m)$I_p$(MA) is the plasma confinement time.

Thus, it will be seen that an ignition spherical torus is provided as a highly cost-effective approach to ignition in magnetic fusion which is extremely compact, and allows the creation of plasma with exceptionally small aspect ratios, from 2 to below 1.3.

The spherical torus has the following unique features and advantages.

1. It allows the creation of plasmas with exceptionally small aspect ratios (A), from below 2 to below 1.3. Even lower aspect ratios are permitted if a toroidal magnetic field lower than 1 T becomes acceptable for high temperature toroidal plasma operation.

2. It permits the full toroidal advantage of small aspect ratio (A) to be brought to bear on toroidal plasmas. These include high average beta above 0.2 (and toward unity if A is less than 1.3), high plasma current in the range of 10 MA, high natural plasma elongation in the range of 2 or more requiring only simple poloidal fields, and improved plasma confinement commensurate with the high plasma current and beta limits.

3. It requires external coil current less than two times the plasma current. Conventional fusion tokamak approaches have invariably led to aspect ratios around 3, requiring coil currents totaling to about 10 times the plasma current for plasma of relatively modest elongation.

4. It requires only external magnetic fields of modest strength which introduce modest loads and forces on the device as a whole relative to conventional tokamaks. This dramatically increases the flexibility of the overall design and component configuration.

5. It permits relatively simply device configurations such as the use of a straight center conductor post with circular cross section, and a roughly spherical shield shell rather than a toroidal shield shell as in conventional tokamaks.

6. It permits compact fusion spherical tori at high beta, with modest magnetic field, and with adequate access to the plasma. This is in contrast to low beta, high field compact tokamaks such as the Riggatron which have severely limited access.

7. Compared to devices of similar size and parameters such as spheromaks and reversed field pinch (RFP) devices, the invention permits higher (tokamak-like) plasma confinement at high beta and modest field.

8. It eliminates the non-essential components inboard to the plasma and retains, for example, a current carrying normal conductor, coolant and, if needed, inorganic insulator. Thus, it also retains the potential of high neutron fluence lifetimes without having to increase the device size, complexity and cost. Conventional fusion tokamaks face severe trade-offs in this area.

9. All the above jointly reduce the cost of the spherical torus fusion device (the load module). The load module in the case of ignition is estimated to be roughly 30% that of the TFCX device, a recent concept of an ignition tokamak. This, in turn, makes it more nearly economical to replace, repair, or upgrade the load module of a fusion spherical torus facility. Smaller percentage reductions (but similar in amount) in the cost of the support systems and facilities also result from the use of spherical tori.

10. Since the plasma fusion power in a spherical torus is nearly proportional to the cube of the major radius, very small driven fusion devices are now possible at fusion powers of a few MW, but will have a fusion power amplification, Q, of the order of unity. In contrast, conventional tokamaks have required fusion power levels of tens of MW for $Q=1$ operation.

Although the invention has been described for an application in D-T fusion ignition other applications based on the ability to produce copious fusion neutrons in a cost-effective manner, such as commercial fusion power, breeding of fissile material, and transmutation of hazardous nuclear wastes, are considered to be within the realm of useful applications of this invention. Thus, various modifications and changes may be made in the illustrated embodiments without departing from the spirit and scope of the appended claims.

I claim:

1. A toroidal plasma confining device, comprising:

a toroidal field generating means including a plurality of toroidal field coils disposed about said toroidal plasma for generating a toroidal magnetic confinement field about said toroidal plasma;

a poloidal field generating means including at least one electrical current conducting coil encircling said toroidal plasma adjacent the outer radius of said toroidal plasma for generating only a vertical magnetic field component within said toroidal plasma which together with said toroidal magnetic confinement field defines a toroidal plasma confinement region for confining said toroidal plasma concentrically about a main vertical axis thereof having an aspect ratio less than 2 and a natural elongation of about 2 such that said toroidal plasma exists in the form of a compact, generally-spherical, toroidal shape; and a vacuum containment means for encapsulating said toroidal plasma in a vacuum environment.

2. A device as set forth in claim 1 wherein each of said plurality of toroidal field coils includes a straight inner segment positioned adjacent the inner side of said toroidal plasma and extending parallel to said main vertical axis to points above and below the elongated extent of said toroidal plasma and an outer segment.

3. A device as set forth in claim 2 wherein each of said plurality of toroidal field coils are formed of a solid electrically conductive material.

4. A device as set forth in claim 3 wherein said straight inner segments of said plurality of toroidal field coils are formed of electrically insulated segments of pie-shaped cross section which wedge together about said main axis to provide a substantially free-standing toroidal field coil arrangement in which the radially inward magnetic forces acting on said inner segments of said toroidal field coils are reacted by the wedged orientation thereof about said main axis.

5. A device as set forth in claim 4 wherein said straight inner segments of said toroidal field coils form a substantially circular cross section center conductor post disposed coaxially with said main axis.

6. A device as set forth in claim 5 wherein said toroidal field coils are rectangular in configuration about said toroidal plasma.

7. A device as set forth in claim 6 wherein said vacuum containment means includes a toroidal vacuum casing surrounding said toroidal plasma immediately adjacent thereto forming a first wall relative to said plasma.

8. A compact toroidal fusion reactor having a toroidal plasma containing fusion region torus concentrically disposed about a main vertical axis, comprising:

a toroidal field generating means including a plurality of toroidal field coils disposed about said toroidal plasma for generating a toroidal magnetic confinement field about said toroidal plasma;

a poloidal field generating means including at least one electrical current conducting coil encircling said fusion region torus adjacent the outer radius of said torus for generating only a vertical magnetic field component within said toroidal plasma which together with said toroidal magnetic confinement field defines a toroidal plasma confinement region for confining said toroidal plasma in said fusion region torus having an aspect ratio less than 2 and a natural elongation of at least 2 such that said toroidal plasma exists in the form of a compact, generally-spherical, toroidal shape;

a vacuum containment means for encapsulating said toroidal plasma in a vacuum enviroment; and a radiation shielding means disposed over said fusion region for intercepting neutrons irradiating from the outer surface of said fusion region torus.

9. A compact toroidal fusion reactor as set forth in claim 8 wherein each of said plurality of toroidal field coils is a generally rectangular field coil formed of a solid conductor and each having a straight inner segment positioned immediately adjacent the inner side of said toroidal plasma and extending parallel to said main vertical axis to points above and below the elongated extent of said plasma and each of said inner segments of said toroidal field coils formed of electrically insulated segments of pie-shaped cross section which wedge together to form a composite circular center conductor post concentric with said main vertical axis.

10. A compact toroidal fusion reactor as set forth in claim 9 wherein said vacuum containment means includes a toroidal vacuum casing surrounding said fusion region and disposed within said plurality of toroidal field coils forming a plasma first wall and including a support means for supporting said plurality of toroidal field coils.

11. A compact toroidal fusion reactor as set forth in claim 10 wherein said radiation shielding means is disposed outboard of said plurality of toroidal field coils and wherein said at least one poloidal field coil includes first and second poloidal field coils disposed in a spaced apart relationship above and below the equatorial midplane of said fusion region torus, respectively, and form an integral part of said radiation shielding means.

12. A compact toroidal fusion reactor as set forth in claim 11 wherein said toroidal plasma has a major radius of 1.5 meters and a toroidal magnet field $B_o$ of 2 tesla and an aspect ratio of 1.5, thereby providing a plasma beta of 24%.

* * * * *